United States Patent [19]

Yamamoto et al.

[11] Patent Number: 4,554,220

[45] Date of Patent: Nov. 19, 1985

[54] MAGNETIC RECORDING MEDIA

[75] Inventors: Nobuyuki Yamamoto; Katsumi Ryoke; Nobuo Tsuji, all of Kanagawa; Yuzo Higaki; Toshihisa Okamura, both of Tokyo, all of Japan

[73] Assignees: Fuji Photo Film Co., Ltd., Japan; Nisshin Oil Mills, Ltd., Japan

[21] Appl. No.: 519,645

[22] Filed: Aug. 2, 1983

[30] Foreign Application Priority Data

Aug. 2, 1982 [JP] Japan .................................. 57-133805

[51] Int. Cl.$^4$ ................................................ G11B 5/70
[52] U.S. Cl. .................................. 428/694; 252/62.51; 252/62.54; 360/134; 360/135; 360/136; 427/128; 428/695
[58] Field of Search ...................... 428/695, 694, 900; 427/128; 360/134–136; 252/62.54, 62.51

[56] References Cited

U.S. PATENT DOCUMENTS 4,201,809 5/1980 Ogawa ................................. 428/480
4,368,239 1/1983 Nakajima ........................... 428/694

FOREIGN PATENT DOCUMENTS 0001651 1/1980 Japan .................................. 428/695

Primary Examiner—Ellis P. Robinson
Attorney, Agent, or Firm—Sughrue, Mion, Zinn, Macpeak, and Seas

[57] ABSTRACT

A magnetic recording medium is described, comprising a non-magnetic support base having positioned thereon a magnetic layer and optionally a non-magnetic layer, wherein at least one layer of the magnetic and non-magnetic layers contains an ester derived from pentaerythritol and/or its condensate and a fatty acid and/or a resin acid. This recording medium has superior surface properties and can be satisfactorily used in tape decks.

12 Claims, No Drawings

MAGNETIC RECORDING MEDIA

FIELD OF THE INVENTION

The present invention relates to magnetic recording media, and more particularly, to magnetic recording media with a magnetic layer having superior surface characteristics, which are superior in lubricity because of low coefficients of friction of the magnetic layer with various materials when passed in contact therewith through magnetic recording/reproducing decks.

BACKGROUND OF THE INVENTION

With magnetic recording media having insufficient lubricity, the surface of a magnetic layer is smoothed by contact with contacting parts of magnetic recording/reproducing decks, resulting in an increase in the coefficient of friction of the magnetic layer. When magnetic recording media with such a magnetic layer having an increased coefficient of friction are passed through magnetic recording/reproducing decks, in particular, under high humidity conditions (relative humidity: at least 60%), cohesion occurs between the magnetic recording media and the contacting parts of the magnetic recording/reproducing decks due to the presence of fine water droplets. When the cohesion phenomenon occurs, if the running tension is greater than the cohesive strength, stick-slip running is caused, producing running noises comprising an audible sound. In recording of magnetic recording media under the stick-slip running, signals recorded are modulated in frequency in the running direction, and normal reproduction becomes difficult. When the stick-slip running occurs during the reproduction of recorded signals, phenomena such as wow, flutter and jitter are caused, and normal reproduction cannot be achieved. On the other hand, when the cohesion phenomenon occurs, if the cohesive strength is greater than the running tension, running is stopped and reproduction becomes impossible. These phenomena are called "tape squeal" in the art, and magnetic recording media and magnetic recording/reproducing decks causing such tape squeal are seriously low in product value.

In the case of magnetic recording/reproducing decks, the tape squeal is caused by the material, running tension, running speed, etc. of the magnetic recording medium running system. In the magnetic recording media, smoothing of the surface, an increase in the coefficient of friction, etc. are responsible for tape squeal.

A number of lubricants, solid or liquid, are used to improve the surface lubricity of magnetic recording media, as described in U.S. Pat. Nos. 3,470,021, 3,525,694, 3,630,772, 3,387,993, 3,542,589, 4,018,968, 3,476,596, 3,547,693, 3,471,415, 2,654,681, 3,781,206, 3,625,760, 3,634,253, 3,274,111, 3,492,235, 4,007,314 and 3,476,596. Examples of such lubricants include inorganic or organic fine powders (e.g., $Al_2O_3$, graphite, silica, $Cr_2O_3$, ZnO, and carbon black) and organic surface active agents (e.g., higher hydrocarbon compounds, aliphatic alcohols, aliphatic acids, aliphatic acid esters, aliphatic acid amides, aliphatic acid salts, and aliphatic acid quaternary salts). There is no limitation on the number of carbon atoms contained in the foregoing compounds, of which are preferred those compounds having a boiling point of at least about 100° C. and a melting point of not higher than about 150° C. The amount of the lubricant added is from 0.1 to 20 parts by weight per 100 parts by weight of the binder.

Addition of such additives does not always succeed in producing a magnetic recording layer having desirable characteristics. For example, the use of large amounts of additives may decrease the mechanical strength of the resulting recording layer and may give rise to the phenomenon that after the formation of the recording layer the additives gradually come out to the surface of the recording layer. Furthermore, dispersion of magnetic substances is not always satisfactory.

For example, the addition of glycerol tristearate as a lubricant to the magnetic layer in an effective amount to inhibit the tape squeal exerts adverse influences on electromagnetic properties, lowering the S/N ratio. When butyl palmitate, which is another example of lubricants, is added to the magnetic recording layer in an effective amount to improve the running properties on guide poles made of stainless steel in the deck running system for magnetic materials, the tape squeal is caused at the deck head portion.

SUMMARY OF THE INVENTION

The present invention is intended to overcome the above-described defects and to provide novel additives for a magnetic recording layer.

An object of the invention is to provide novel additives for use in a magnetic recording layer, which make it possible to produce magnetic recording media having superior running properties.

Another object of the invention is to provide magnetic recording media with a magnetic layer having improved surface properties.

Still another object of the invention is to provide magnetic recording media having good sensitivity.

A further object of the invention is to provide magnetic recording media having good storage properties, in which no additive comes out to the surface thereof.

The present invention relates to a magnetic recording medium comprising a non-magnetic support base having positioned thereon a magnetic layer and optionally a non-magnetic layer wherein at least one of the magnetic layer and the non-magnetic layers contains an ester derived from a polyhydric alcohol selected from the group consisting of pentaerythritol and its condensate and an acid selected from the group consisting of fatty acids and resin acids.

DETAILED DESCRIPTION OF THE INVENTION

Pentaerythritol and/or its condensate as used herein in combination with a fatty acid and/or a resin acid to produce the desired ester (hereinafter referred to as an "ester compound") is a polyhydric alcohol represented by the general formula (I):

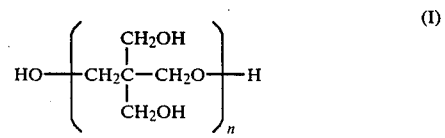

wherein n is an integer of 1 or more.

In general, the compounds of the general formula (I) in which n is 1, 2, or 3, i.e., pentaerythritol, dipentaerythritol, tripentaerythritol, and mixtures thereof, are generally available on an industrial scale and are preferably used in the present invention.

The term "fatty acid" as used herein means a carboxylic acid containing one carboxyl group. There is no particular limitation on the number of carbon atom contained in the fatty acid, but it is preferably from 3 to 30 and more preferably from 8 to 26. Preferred examples of fatty acids include straight fatty acids such as propionic acid, caproic acid, caprylic acid, pelargonic acid, capric acid, lauric acid, myristic acid, palmitic acid, hexadecenic acid, stearic acid, oleic acid, linoleic acid, linolenic acid, arachic acid, erucic acid and behenic acid, and branched aliphatic acids such as isocaprylic acid, isomyristic acid, isopalmitic acid, and isostearic acid.

The term "resin acid" as used herein means organic acids existing in natural resins in a free form or in the form of esters, as described in *Encyclopaedia Chemica*, 4, 688–689, published by Kyoritsu Suppan K.K. (1967). For example, rosin comprising abietic acid, dehydroabietic acid, neoabietic acid, palustric acid, pimaric acid, etc. can be used.

The ester compounds as used herein can be prepared by reacting one member of the above-described polyhydric alcohols or a mixture of two or more thereof with one member of the fatty acids and resin acids or a mixture of two or more thereof.

In this esterification, it is preferred that a fatty acid(s) or a mixture of a fatty acid and a resin acid is used as an acid component. With regard to the mixing ratio of the fatty acid to the resin acid, it is preferred that the amount of the resin acid is 30 mol% or less of the total amount of the fatty acid. The ester compounds may be either those compounds in which all the hydroxyl (OH) groups contained in the polyhydric alcohol are esterified with the fatty acid and/or resin acid, or partial ester compounds in which some OH groups remain unreacted.

The ester compounds take various forms, liquid, paste, or solid at ordinary temperature, depending on the type of the fatty acid or resin acid, the amount of the fatty acid or resin acid being compounded, the number of ester groups contained in one polyol molecule, and the type of the polyol. From a viewpoint of running properties, those esters of in paste type to solid type at ordinary temperature are preferably used in the present invention. The melting point of ester compounds is preferably within the range of −30° to 150° C. and more preferably the range of −20° to 80° C.

Typical examples of ester compounds as used herein are shown below, but the present invention is not limited thereto.

A-1: Hexaester of dipentaerythritol and behenic acid-/isocaprylic acid (molar ratio: 1/1) (m.p., 30°–45° C.)
A-2: Triester of pentaerythritol and partially hydrogenated beef tallow aliphatic acid (m.p., 43°–53° C.)
A-3: Pentaerythritol monostearate (m.p., 60°–63° C.)
A-4: Pentaerythritol distearate (m.p., 50°–53° C.)
A-5: Pentaerythritol tetralaurate (m.p., 49°–50° C.)
A-6: Pentaerythritol tetramyristate (m.p., 60°–61° C.)
A-7: Pentaerythritol trimyristate (m.p., 40°–51° C.)
A-8: Pentaerythritol dimyristate (m.p., 41°–47° C.)
A-9: Pentaerythritol tetrapalmitate (m.p., 62°–63° C.)
A-10: Tetraester of pentaerythritol and stearic acid-/oleic acid (molar ratio: 1/1) (m.p., 30°–61° C.)
A-11: Pentaerythritol tetraerucate (liquid)
A-12: Tetraester of tripentaerythritol and stearic acid-/isostearic acid (molar ratio: 3/1) (m.p., 35°–50° C.)
A-13: Pentaester of dipentaerythritol and isostearic acid/oleic acid (molar ratio: 2/3) (liquid)

Known ferromagnetic fine powders can be used in the invention, including $\gamma$-$Fe_2O_3$, Co-containing $\gamma$-$Fe_2O_3$, $Fe_3O_4$, Co-containing $Fe_3O_4$, $CrO_2$, Co-Ni-P alloy, and Co-Ni-Fe alloy. Specific examples are described in Japanese Patent Publication Nos. 14090/69, 18372/70, 22062/72, 22513/72, 28466/71, 38755/71, 4286/72, 12422/72, 17284/72, 18509/72, and 18573/72.

The amount of the magnetic powder used is from 50 to 2,000 parts by wieght per 100 parts by weight of the binder. Hereinafter, unless otherwise specified, all parts are by weight.

The amount of the ester compound to be added is from 0.01 to 20 parts, preferably from 0.1 to 10 parts, preferably from 0.5 to 5 parts, per 100 parts of the magnetic powder.

The ester compound can be added in various manners. For example, the ferromagnetic fine powder is impregnated with the ester compound, the ester compound is added before or after the dispersion of the ferromagnetic fine powder in the binder, or the ester compound is coated on the magnetic layer which has been coated on a support base. Furthermore, the ester compound may be coated on the surface of a support base on which no magnetic layer has been provided and, thereafter, transferred to a magnetic layer on the other surface of the support base, or may be sprayed by means of, e.g., a spray. The ester compound may be coated in a discontinuous condition. When the magnetic recording medium has non-magnetic layers such as a back layer and a protective layer, the ester compound may be incorporated in both the magnetic layer and the non-magnetic layer(s), or may be incorporated in the non-magnetic layer(s).

Useful binders include conventionally known thermoplastic resins, thermosetting or reactive resins, and their mixtures.

Thermoplastic resins which can be used are those resins having a softening point of 150° C. or lower, an average molecular weight of from 10,000 to 200,000, and a degree of polymerization of about 200 to about 500, and mixtures thereof. Examples are a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (e.g., cellulose acetate butyrate, cellulose diacetate, cellulose triacetate, cellulose propionate, and cellulose nitrate), a styrene-butadiene copolymer, a polyester resin, a chloro vinyl ether-acrylic acid ester copolymer, an amino resin, and various synthetic rubbers.

Specific examples of these resins are described in, for example, Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, and 27886/72.

Thermosetting or reactive resins have a molecular weight of 200,000 or less in the state of coating solution and, when heated after coating and drying, undergo reactions such as condensation and addition, having an infinite molecular weight. Of these resins, those resins are preferred that do not soften or melt before heat-decomposition occurs. Typical examples are a phenol resin, an epoxy resin, a polyurethane curing type resin, a urea resin, a melamine resin, an alkyd resin, a silicone resin, an acryl-based reactive resin, an epoxy-polyamide resin, a cellulose nitrate-melamine resin, a mixture of a high molecular weight polyester resin and an isocyanate prepolymer, a mixture of a methacrylate copolymer and a diisocyanate prepolymer, a mixture of polyester polyol and polyisocyanate, a urea-formaldehyde resin, a mixture of low molecular weight glycol/high molecular weight diol/triphenylmethane triisocyanate, a polyamine resin, and their mixtures.

These compounds are described in Japanese Patent Publication Nos. 8103/64, 9779/65, 7192/66, 8016/66, 14275/66, 18179/67, 12081/68, 28023/69, 14501/70, 24902/70, 13103/71, 22065/72, 22056/72, 22067/72, 22072/72, 22073/72, 28045/72, 28048/72, 28922/72, etc.

These binders are used alone or in combination with each other. Other additives such as dispersants, lubricants and abrasives may be added thereto.

Various lubricants can be used in combination with the ester compounds of the invention. Examples of such lubricants include carbon black of various sizes (mean grain size: 10 to 1,000 m$\mu$), silicone oil, graphite, molybdenum disulfide, tungsten disulfide, fatty acid esters derived from monobasic fatty acids containing from 12 to 16 carbon atoms and monohydric alcohols containing from 3 to 12 carbon atoms, fatty acid esters derived from monobasic fatty acids containing at least 17 carbon atoms and monohydric alcohols (wherein total number of carbon atoms in the fatty acid and alcohol being from 21 to 23) and their mixtures. These lubricants can be added in an amount of 0.2 to 20 parts per 100 parts of the binder. Specific examples of such lubricants are described in Japanese Patent Publication No. 23889/68, U.S. Pat. No. 3,423,233, and Japanese Patent Publication No. 28043/72.

Dispersants which can be used include fatty acids containing from 12 to 18 carbon atoms: $R_1COOH$ (wherein $R_1$ is an alkyl group containing from 11 to 17); for example, caprylic acid, capric acid, lauric acid, myristic acid, palmitic acid, stearic acid, oleic acid, elaidic acid, linoleic acid, linolenic acid, and stearolic acid; metallic soaps comprising the alkali metal (e.g., Li, Na, and K) or alkaline earth metal (e.g., Mg, Ca, and Ba) salts of the foregoing fatty acids; and lecithin. In addition, higher alcohols containing at least 12 carbon atoms and their sulfuric acid esters, etc. can be used. The amount of the dispersant added is from 1 to 20 parts per 100 parts of the binder. Specific examples of such dispersants are described in, for example, Japanese Patent Publication Nos. 28369/64, 17945/69, 15001/73, U.S. Pat. Nos. 3,387,993, and 3,470,021.

Commonly used abrasives can be used, including fused alumina, silicon carbide, chromium oxide, corundum, synthetic corundum, diamond, synthetic diamond, garnet, and emery (main components: corundum and magnetite). The mean grain diameter of the abrasives is from 0.05 to 5 $\mu$m and preferably from 0.1 to 2 $\mu$m. The amount of the abrasive added is from 2 to 20 parts per 100 parts of the binder. Specific examples of the abrasives are described in, for example, U.S. Pat. No. 3,687,725.

Organic solvents which can be used in kneading and coating include ketones such as acetone, methyl ethyl ketone, methyl butyl ketone, and cyclohexanone; alcohols such as methanol, ethanol, propanol, and butanol; esters such as methyl acetate, ethyl acetate, butyl acetate, ethyl lactate, and glycol acetate monoethyl ether; ethers and glycol ethers such as glycol dimethyl ether, glycol monoethyl ether, and dioxane; tars (aromatic hydrocarbons) such as benzene, toluene, and xylene; and chlorinated hydrocarbons such as methylene chloride, ethylene chloride, carbon tetrachloride, chloroform, ethylenechlorohydrin, and dichlorobenzene.

In preparing a magnetic layer, a desired combination of the above-described components is dissolved in an organic solvent, and the resulting coating solution is then coated on a non-magnetic support base. The thickness of the magnetic layer is generally from 0.01 to 50 $\mu$m, preferably from 0.05 to 30 $\mu$m and more preferably from 0.1 to 20 $\mu$m. When a tape is to be produced, the thickness of the support base is from about 2.5 to about 100 $\mu$m and preferably from about 3 to about 40 $\mu$m. Materials which can be used in preparing such supports include polyesters such as polyethylene terephthalate and polyethylene naphthalate; polyolefins such as polypropylene; cellulose derivatives such as cellulose triacetate and cellulose diacetate; vinyl-based resins such as polyvinyl chloride; polycarbonate; and like plastics; metals such as aluminum; and ceramics such as glass.

The foregoing magnetic recording layer can be provided on the support base by techniques such as air doctor coating, blade coating, air knife coating, squeese coating, dip coating, reverse roll coating, transfer roll coating, gravure coating, kiss coating, cast coating, and spray coating. Other coating methods can be used. These coating techniques are described in detail in *Coating Kogaku (Coating Engineering)*, published by Asakura Shoten (Tokyo), pp. 253–277 (Mar. 20, 1971).

The magnetic layer thus coated on the support is, if necessary, subjected to a treatment to orientate the magnetic powder therein and then dried. Further, if necessary, a surface smoothning processing is applied, or the magnetic material is cut to the desired size to produce the magnetic recording medium of the invention. These procedures are described in, for example, Japanese Patent Publication Nos. 23625/65, 28368/64, and U.S. Pat. No. 3,473,960. In addition, the methods described in Japanese Patent Publication No. 13181/66 are believed to be basic and important techniques in this field.

The present invention is hereinafter described in greater detail by reference to the following examples. It will be understood that the components, the compounding ratio, the order of operations, etc. can be changed or modified without departing from the spirit of the invention. Thus the present invention is not limited to the examples.

EXAMPLE 1

$\gamma$-$Fe_2O_3$ powder: 300 parts
Vinyl chloride-vinyl acetate (87/13) copolymer (degree of polymerization: about 400): 30 parts
Epoxy resin (epoxy group content: 0.56): 30 parts
Carbon black (mean grain size: 80 m$\mu$): 5 parts
Ethyl acetate: 250 parts
Cyclohexanone: 250 parts
Compound to be tested: x parts These ingredients were placed in a ball mill and fully kneaded, and 35 parts of Desmodule L-75 (trade name for a polyisocyanate compound produced by Bayer Co.) was added thereto. The resulting mixture was uniformly mixed and dispersed to prepare a magnetic coating composition.

This composition was coated on a polyester film support and dried to produce a magnetic tape.

Run No. 1 is a comparative example in which no lubricant was added, Run Nos. 2 and 3 are examples in which Compound A-1 was added, and Run Nos. 4 to 7 are comparative examples in which conventionally known lubricants were each added. The results are shown in Table 1 below.

TABLE 1

| Run No. | Compound | Amount (× parts) | Number of Runnings | RF Output | Surface Properties |
|---|---|---|---|---|---|
| 1 | None | — | 16 | 0 dB | A |
| 2 | A-1 | 1 | more than 60 | +1.0 dB | A |
| 3 | A-1 | 10 | more than 60 | +1.1 dB | A |
| 4 | Butyl Palmitate | 1 | 19 | +1.2 | A |
| 5 | Butyl Palmitate | 10 | 10 | +1.4 | A |
| 6 | Glycerol tristearate | 1 | more than 60 | * | B |
| 7 | Glycerol tristearate | 10 | more than 60 | * | B |

Note:
*Not measured because of many dropouts.

The methods of measurement and the criterion are as follows:

Number of Runnings

A test tape was mounted on a tape deck and repeatedly run under the conditions of 30° C. and 80% RH. The number of runnings until "tape squeal" occurred was measured twice, and the average value of two measurements was indicated.

RF Output

With regard to the RF output, an output when 4 MHz was recorded and reproduced was indicated in relative dB.

Surface Properties

The surface properties were determined with a microscope and the eye. A test tape, when no contaminants were observed on the magnetic surface thereof, was given the symbol "A", and when some contaminants were observed, the symbol "B" was given.

In Run Nos. 4 to 7, i.e., comparative examples in which the conventionally known compounds were used, the number of runnings, RF output and surface properties were not satisfactory. In Run Nos. 2 and 3, i.e., examples of the invention, the addition of the dipentaerythritolaliphatic acid ester brought about satisfactory tape characteristics.

EXAMPLE 2

$\gamma$-Fe$_2$O$_3$ powder: 300 parts
Vinyl chloride-vinyl acetate-vinyl alcohol (90/3/7) copolymer: 30 parts
Epoxy resin: 30 parts
Carbon black (mean size: 35 m$\mu$): 10 parts
Lecithin: 2 parts
Oleic acid: 3 parts
Ethyl acetate: 250 parts
Cyclohexanone: 250 parts
Compound to be tested: x parts These ingredients were placed in a ball mill and fully mixed, and 20 parts of Desmodule L-75 was then added thereto. The resulting mixture was uniformly dispersed to prepare a magnetic coating composition.

This composition was coated on a polyester film support and dried to produce a magnetic tape.

The magnetic tape thus produced was tested in the same manner as in Example 1, and the results are shown in Table 2 below.

TABLE 2

| Run No. | Compound | Amount (× parts) | Number of Runnings | RF Output |
|---|---|---|---|---|
| 8 | None | — | 13 | 0 dB |
| 9 | A-2 | 1 | 19 | 0.9 dB |
| 10 | A-2 | 10 | more than 60 | 1.0 dB |
| 11 | A-3 | 1 | more than 60 | 0.9 dB |
| 12 | A-3 | 10 | more than 60 | 0.9 dB |
| 13 | A-4 | 1 | more than 60 | 1.1 dB |
| 14 | A-4 | 10 | more than 60 | 1.0 dB |
| 15 | Butyl stearate | 1 | 12 | 1.0 dB |
| 16 | Butyl stearate | 10 | 10 | 1.2 dB |

It can be seen from Table 2 that the magnetic tapes containing Compounds A-2, A-3, and A-4 are superior in the number of runnings and the RF output to the magnetic tapes containing butyl stearate, conventionally known ester.

EXAMPLE 3

$\gamma$-Fe$_2$O$_3$ powder: 300 parts
Cellulose nitrate (molecular weight: about 10,000): 30 parts
Epoxy resin: 30 parts
Carbon black: 10 parts
Myristic acid: 5 parts
Amyl stearate: 5 parts
Lecithin: 2 parts
Cyclohexanone: 250 parts
Methyl ethyl ketone: 250 parts
Compound to be tested: 5 parts These ingredients were placed in a ball mill and fully mixed, and 40 parts of Desmodule L-75 was added thereto. The resulting mixture was uniformly dispersed to prepare a magnetic coating composition.

This composition was coated on a polyester film support and dried to produce a magnetic tape. The magnetic tape was tested, and the results are shown in Table 3 below.

TABLE 3

| Run No. | Compound | Number of Runnings | RF Output |
|---|---|---|---|
| 17 | None | 0 | 0 dB |
| 18 | A-3 | 42 | +0.1 dB |
| 19 | A-4 | 54 | 0 dB |
| 20 | A-5 | 28 | 0 dB |
| 21 | A-6 | 20 | −0.1 dB |
| 22 | A-10 | 34 | −0.2 dB |
| 23 | A-11 | 32 | +0.1 dB |
| 24 | A-7 | 20 | 0 dB |
| 25 | A-8 | 28 | +0.1 dB |
| 26 | A-12 | 24 | −0.2 dB |
| 27 | A-13 | 29 | +0.1 dB |

The test for the number of runnings was performed under the conditions of 25° C. and 85% RH, and the other test was performed under the same conditions as in Example 1.

It can be seen that even in examples in which many additives have been added to satisfy many characteristics required for magnetic tapes, the addition of the ester compounds of the invention produces marked effects.

While the invention has been described in detail and with reference to specific embodiment thereof, it will be apparent to one skilled in the art that various changes and modifications can be made therein without departing from the spirit and scope thereof.

What is claimed is:

1. A magnetic recording medium, comprising a non-magnetic support base having positioned thereon, a magnetic layer containing a ferromagnetic powder and an ester derived from a polyhydric alcohol selected from the group consisting of pentaerythritol and pentaerythritol condensates and a mixture of fatty acids and resin acids.

2. A magnetic recording medium as claimed in claim 1, wherein the polyhydric alcohol is a compound represented by the general formula (I):

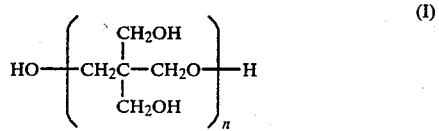

wherein n is an integer of 1 or more.

3. A magnetic recording medium as claimed in claim 2, wherein n is selected from the group consisting of 1, 2 and 3.

4. A magnetic recording medium as claimed in claim 1, wherein the fatty acid is selected from the group consisting of propionic acid, caproic acid, caprylic acid, pelargonic acid, capric acid, lauric acid, myristic acid, palmitic acid, hexadecenic acid, stearic acid, oleic acid, linoleic acid, linolenic acid, arachic acid, erucic acid, behenic acid, isocaprylic acid, isomyristic acid, isopalmitic acid and isostearic acid.

5. A magnetic recording medium as claimed in claim 1, wherein the resin acid is selected from the group consisting of abietic acid, dehydroabietic acid, neoabietic acid, palustric acid and pimaric acid.

6. A magnetic recording medium as claimed in claim 1, wherein the ester is present in an amount of 0.01 to 20 parts by weight per 100 parts by weight of the ferromagnetic powder.

7. A magnetic recording medium as claimed in claim 6, wherein the ester is present in an amount of 0.1 to 10 parts by weight per 100 parts by weight of the ferromagnetic powder.

8. A magnetic recording medium as claimed in claim 7, wherein the ester is present in an amount in the range of 0.5 to 5 parts by weight per 100 parts by weight of the ferromagnetic powder.

9. A magnetic recording medium as claimed in claim 1, wherein the mixture contains 30 mol% or less of the resin acid based on the total amount of the fatty acid.

10. A magnetic recording medium as claimed in claim 1, wherein the fatty acid contains 3 to 30 carbon atoms.

11. A magnetic recording medium as claimed in claim 10, wherein the fatty acid contains 8 to 26 carbon atoms.

12. A magnetic recording medium as claimed in claim 1, wherein the fatty acid is selected from the group consisting of propionic acid, caproic acid, caprylic acid, pelargonic acid, capric acid, lauric acid, myristic acid, palmitic acid, hexadecenic acid, stearic acid, oleic acid, linoleic acid, linolenic acid, arachic acid, erucic acid, behenic acid, isocaprylic acid, isomyristic acid, isopalmitic acid and isostearic acid and wherein the resin acid is selected from the group consisting of abietic acid, dehydroabietic acid, neoabietic acid, palustric acid and pimaric acid, wherein the mixture contains 30 mole% or less of the resin acid based on the total amount of fatty acid and wherein the ester is present in an amount of 0.01 to 20 parts by weight per 100 parts by weight of the ferromagnetic powder.

* * * * *